J. D. HENDRIX.
BEER COOLER.
APPLICATION FILED OCT. 3, 1907.
911,405.
Patented Feb. 2, 1909.
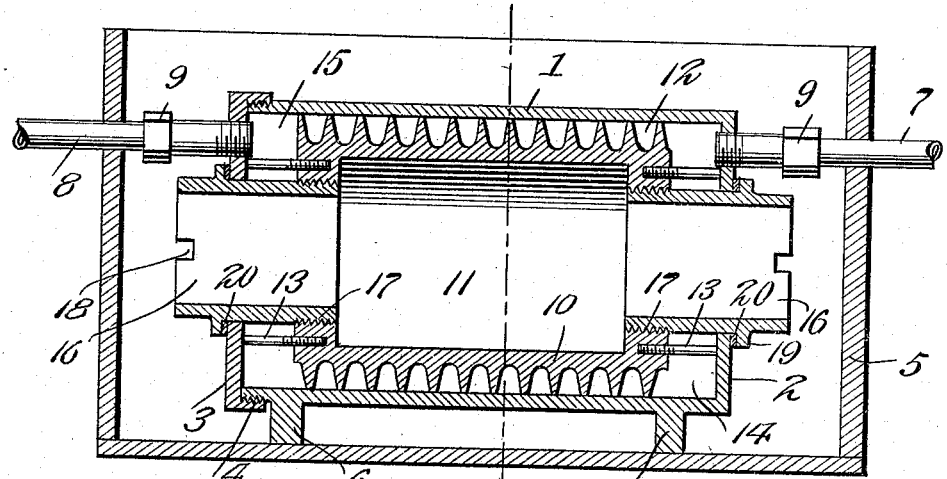
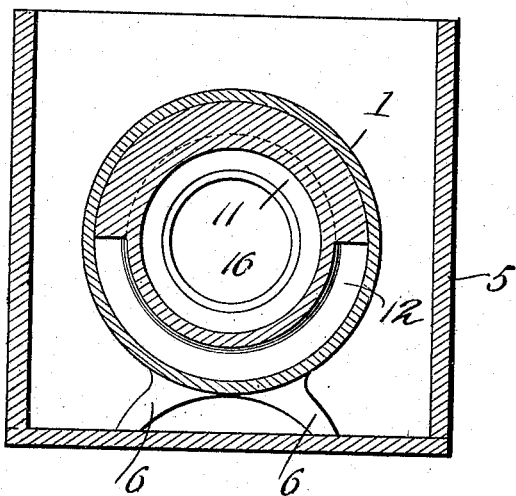
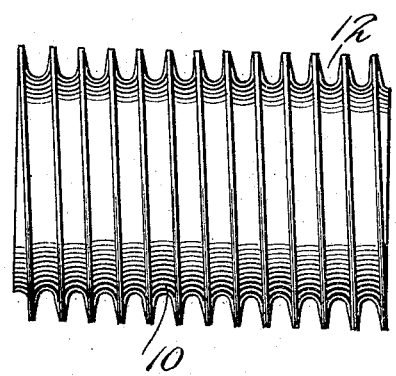
Witnesses
Inventor
John David Hendrix
By Victor J. Evans.
Attorney

UNITED STATES PATENT OFFICE.

JOHN D. HENDRIX, OF MONTGOMERY, ALABAMA, ASSIGNOR TO HENDRIX-MAY REFRIGERATOR COMPANY, A CORPORATION OF GEORGIA.

BEER-COOLER.

No. 911,405.　　　　　Specification of Letters Patent.　　　　Patented Feb. 2, 1909.

Application filed October 3, 1907. Serial No. 395,763.

*To all whom it may concern:*

Be it known that I, JOHN D. HENDRIX, a citizen of the United States, residing at Montgomery, in the county of Montgomery and State of Alabama, have invented new and useful Improvements in Beer-Coolers, of which the following is a specification.

This invention relates to beer coolers, the object of the invention being to provide a simple and effective beer cooling device which may be sold at a reasonable figure, easily installed, and one which is adapted to be taken apart in order that the several parts thereof may be easily and thoroughly cleansed.

With the above and other objects in view, the nature of which will more fully appear as the description proceeds, the invention consists in the novel construction, combination and arrangement of parts hereinafter fully described, illustrated and claimed.

In the accompanying drawing, Figure 1 is a vertical longitudinal section through a beer cooler embodying the present invention.
Fig. 2 is a vertical cross-section through the same taken on the line 2—2 of Fig. 1. Fig. 3 is a detail plan view of the core or cooling chamber.

The beer cooler contemplated in this invention comprises essentially an outer casing 1 which is preferably cylindrical and normally closed at both ends, one end, under the preferred embodiment of the invention, being formed integrally with the outer casing as shown at 2, while the other end is made in the form of a removable head 3 which is threaded upon the adjacent end of the casing 1 as shown at 4.

The casing above described is placed in an ice-box 5 of suitable size and is further provided with supporting feet 6 which hold the casing 1 in a sufficiently elevated position to allow ice and ice water to find their way beneath it. The said outer casing is further provided with inlet and outlet pipes 7 and 8, respectively, which are shown as communicating with the casing 1 at or near the top thereof and said pipes are provided with couplings or unions 9 within the box 5 in order that the casing 1 may be disconnected from the inlet and outlet pipes to admit of the removal of said casing from the ice-box for cleaning purposes.

Within the casing 1 is mounted a hollow core 10 forming a central inner cooling chamber 11 while the outer surface or periphery of the core is formed with a continuous spiral groove 12 running from end to end thereof, the said groove forming in connection with the inner wall of the outer casing 1 an inclosed spiral passage along which the beer is carried under pressure after being admitted through the inlet. The core 10 is further provided at its opposite ends with centering projections 13 which are shown illustrated in the form of pins screwed into the opposite ends of the core and adapted to bear at their outer ends against the opposite end walls of the outer casing 1. The centering projections 13 are of suitable length to leave receiving and delivery chambers 14 and 15 at opposite ends of the casing between the ends of the core and casing as clearly shown in Fig. 1.

Tubular inlet connections 16 project from the opposite ends of the core being preferably threaded therein as shown at 17 and provided in their outer ends with notches 18 adapting them to be turned by means of a spanner or other suitable implement. The connections 16 are also provided with annular shoulders 19 which lie outside of the ends of the outer casing. Suitable packing washers 20 may be interposed between the shoulders 19 and the ends of the outer casing to make a liquid tight joint and prevent the beer and water from coming in contact with each other.

The beer passing in through the inlet 7 enters the receiving chamber 14 and then passes along the spiral passage finally reaching the delivery chamber 15 from which it is drawn off through the outlet pipe 8. In such passage the beer is thoroughly cooled by the ice contained in the box 5 and in which the outer casing 1 is embedded, the ice water passing through the connections 16 into and through the cooling chamber 11 and particles of the ice being also adapted to enter said connections and cooling chamber. In view of the manner in which the several parts of the apparatus are combined, the said parts may be readily disassembled, cleaned and re-assembled, thus making the device as a whole thoroughly sanitary.

Another very important advantage of the invention resides in the fact that the apparatus is exceedingly economical in the use of ice as compared with the ordinary beer cooling apparatus now in common use.

Having thus fully described the invention, what is claimed as new is:—

1. A beer cooler comprising an ice box, and a beer receiver detachably mounted therein and embodying an outer casing, beer inlet and outlet connections for said outer casing, a hollow core mounted in said casing and provided with a spiral groove in its outer face which in connection with the outer casing forms a spiral passageway for the beer, tubular inlet connections for the core leading therefrom through opposite walls of the outer casing, and centering projections on the core for positioning said core within the casing to leave beer receiving and delivery chambers.

2. A beer cooler comprising an ice box, a beer receiver mounted therein and embodying an outer casing, beer inlet and outlet pipes therefor, a hollow core mounted in said casing and having a spirally grooved periphery which in connection with the outer casing forms a spiral passage-way for the beer, and tubular inlet connections for said core extending therefrom through opposite walls of the outer casing, said connections being shouldered in such manner as to establish a liquid tight joint with the outer casing.

In testimony whereof I affix my signature in presence of two witnesses.

JOHN D. HENDRIX.

Witnesses:
    REXFORD M. SMITH,
    K. ALLEN.